US009134406B2

(12) United States Patent
Peters (10) Patent No.: US 9,134,406 B2
(45) Date of Patent: Sep. 15, 2015

(54) METHOD AND DEVICE FOR MEASURING A CHANGE IN DISTANCE (75) Inventor: Gerhard Peters, Hamburg (DE)

(73) Assignee: METEK METEROLOGISCHE MESSTECHNIK GMBH (DE)

( * ) Notice: Subject to any disclaimer, the term of this patent is extended or adjusted under 35 U.S.C. 154(b) by 680 days.

(21) Appl. No.: 13/377,126

(22) PCT Filed: Jun. 2, 2010

(86) PCT No.: PCT/DE2010/000609
§ 371 (c)(1),
(2), (4) Date: Feb. 27, 2012

(87) PCT Pub. No.: WO2010/142267
PCT Pub. Date: Dec. 16, 2010

(65) Prior Publication Data
US 2012/0146838 A1 Jun. 14, 2012

(30) Foreign Application Priority Data
Jun. 9, 2009 (DE) .......................... 10 2009 024 883

(51) Int. Cl.
G01S 13/08 (2006.01)
G01S 13/34 (2006.01)
G01S 13/536 (2006.01)

(52) U.S. Cl.
CPC .............. G01S 13/34 (2013.01); G01S 13/536 (2013.01)

(58) Field of Classification Search
CPC ...... G01S 13/34; G01S 13/536; G01S 7/4004
USPC .......................................... 342/118, 128, 70
See application file for complete search history.

(56) References Cited

U.S. PATENT DOCUMENTS 7,663,534 B2 * 2/2010 Hilsebecher et al. .......... 342/109
7,714,771 B2 * 5/2010 Lehre et al. ................... 342/109
7,786,927 B2 * 8/2010 Kondoh ......................... 342/109
(Continued)

OTHER PUBLICATIONS

Yamaguchi, Y.; Sengoku, M.; Abe, T.; Boerner, W-M, "FM-CW radar applied to the detection of buried objects in snowpack," Antennas and Propagation Society International Symposium, 1990. AP-S. Merging Technologies for the 90's. Digest. , vol., No., pp. 738-741 vol. 2, May 7-11, 1990.*

(Continued)

Primary Examiner — John B Sotomayor
(74) Attorney, Agent, or Firm — The Ollila Law Group LLC (57) ABSTRACT Described is a device as well as a method for measuring a change in distance between a stationary initial point and an object, wherein frequency-modulated, continuous electromagnetic microwaves are emitted as an emitting signal (4) in the direction of the object such that the emitting signal (4) is reflected by the object and an echo signal (5) generated at the object following the reflection of the emitting signal (4) is received and evaluated.

The method described or the FMCW radar apparatus designed according to the invention, respectively, is based on a hardware extension of a standard FMCW radar apparatus and offers the possibility of evaluating a time-independent part of the mixed signal phase (6) by means of evaluation electronics (18) while taking into account a propagation time of the emitting (4) and/or echo signal (5) between emitting unit (2) and object so that a change in distance between emitting unit (2) and object can be detected as a result of a change in propagation time.

11 Claims, 3 Drawing Sheets

(56) References Cited

U.S. PATENT DOCUMENTS

| | | | |
|---|---|---|---|
| 8,599,062 B2* | 12/2013 | Szajnowski | 342/109 |
| 2003/0052813 A1* | 3/2003 | Natsume | 342/70 |
| 2007/0013578 A1* | 1/2007 | Iritani et al. | 342/118 |
| 2012/0146838 A1* | 6/2012 | Peters | 342/128 |
| 2012/0268317 A1* | 10/2012 | Himmelstoss et al. | 342/192 |

OTHER PUBLICATIONS

Varavin, A V.; Ermak, G. P.; Vasilev, A S.; Evdokimov, A P.; Kryzanovsky, V. V., "Range resolution improvement for low-cost FMCW self-mixing radar," Radar Symposium (IRS), 2010 11th International, vol., No., pp. 1,4, Jun. 16-18, 2010.*

* cited by examiner

Fig. 1

PRIOR ART

METHOD AND DEVICE FOR MEASURING A CHANGE IN DISTANCE

The instant application should be granted the priority dates of Jun. 9, 2009, the filing date of the corresponding German patent application 10 2009 024 883.8, as well as Jun. 2, 2010, the filing date of the International patent application PCT/DE2010/000609.

FIELD OF THE INVENTION

The invention relates to a device as well as a method for measuring a change in distance between a FMCW Doppler radar and an object, wherein first a mixed signal is formed from an emitting and an echo signal, and subsequently the distance between the Doppler radar and the object to be measured is determined by determining the derivation of the mixed signal phase.

BACKGROUND OF THE INVENTION

For distance measurement or for measuring a change in distance, respectively, just like in other areas of application for radar apparatuses, two radar technologies, which differ in their mode of operation, are eligible. Here, substantially a distinction is made between pulse and CW or continuous wave radar apparatuses, respectively. A pulse radar apparatus emits pulses with a typical duration in the lower microsecond range and eventually receives the reflected echo. In this case, the propagation time of the pulse is used for distance determination.

Contrary to pulse radar apparatuses, CW radar apparatuses (continuous wave radar) emit continuous emitting signals. Such CW radar apparatuses are frequently used for speed measurement of moving objects, for example in road traffic, wherein in this application, the Doppler effect, i.e. a frequency shift of the echo compared to the emitting signal, is evaluated. Distance measurement with such radar apparatuses, which emit continuous emitting signals, however, is only possible with comparatively high effort and in a frequently unsatisfying uniqueness range.

Beside CW radar apparatuses working with a constant emitting or echo frequency, respectively, frequency-modulating continuous wave radar apparatuses (FMCW) are known. With this' type of radar apparatus, the frequency of the emitting signal is modulated, wherein in particular the frequency within one time interval varies, i.e. is reduced or increased, so that a so-called sweep is used as emitting and echo signal. Contrary to the pulse radars indicated above, CW and FMCW radars do not require high transmitting power in order to achieve a good signal-to-noise ratio. Since these radar apparatuses, however, generate and emit continuous emitting signals, the time, which the signal requires for the distance from the radar to the object and back, cannot be directly used for distance measurement. The distance is rather determined from the difference in frequency between emitting and echo signals. This difference in frequency ultimately results from the fact that due to the time lag of the echo signal from the difference in propagation time, the momentary frequency of the echo signal is always higher or lower than that of the emitting signal.

The invention is applied with FMCW radar apparatuses, i.e. devices, which emit frequency-modulated emitting signals with a constant output. The substantial component of the FMCW or continuous wave radar apparatus, respectively, is a free-running, voltage-controlled oscillator with an integrated mixer. The generated signal is guided to the antenna through a waveguide in the form of frequency-modulated, frequently linearly polarized electromagnetic waves. Finally, the echo signal reflected by an object to be measured is received by a receiving unit, which is frequently integrated in the same antenna like the emitting unit, and passed on to the integrated mixer diode. Since this mixer diode is additionally fed with a portion of the emitting signal, it acts as a mixer of the two signals. From the temporal change in the mixed signal phase generated in this manner, the distance between radar apparatus and object to be measured is determined.

All such radar measuring methods have the fundamental necessity in common, to guarantee at least sectionally linear changes in frequency within the modulation interval. For that, for example, EP 0 499 952 A1 suggests a radar system, which provides means and methods for testing and correcting the linearity of the modulation.

Furthermore, from U.S. Pat. No. 4,106,020, a radar system for determining the material height in a blast furnace is known. In this case, a FMCW radar system is used for determining distances, in which undesired fluctuations of the frequency deviation, i.e. of the difference in frequency within one modulation interval, and/or the ramp duration of the modulation, are compensated by a scaling device. In that, the respective difference frequency representing a radar target is determined by means of a counting device, wherein the counting duration is varied depending on the frequency deviation and the ramp duration. The technical solution described may preferably be used for a known object to be measured, beyond that, however, it can neither be used flexibly nor for different objects to be measured.

From DE 196 32 889 A1, a further radar system with a frequency-modulated emitting signal is known, in which, measuring errors resulting from a change in the respective frequency deviation within a modulation interval, which is also called bandwidth of the frequency, are to be largely avoided. With the technical solution described, this in particular is to be achieved by the fact that means are provided, which determine the respective effective actual frequency deviation of the modulation as a quantifiable numerical value. In that, a special further development of the method described suggests using the determined, effective actual frequency deviation for calculation of the distance to the object to be measured.

In conventional distance measurement using FMCW radar, the frequency of a mixed signal generated by mixing emitting and receiving signals is evaluated. Evaluating the mixed frequency, practical limits are in particular set to distance resolution and thus the measurable change in distance. Among other things, this is attributable to the fact that the frequency of the mixed signal is not sufficiently stable, and in particular in the course of the operating time of a radar apparatus shows a certain drift, which is predominantly caused by ageing of the electronic components as well as temperature changes.

The use of FMCW radar apparatuses for the measurement of changes in distance has so far above all been excluded, since the relative error of the emitting frequency effects a relative error of the distance measurement, which is just as high. Here, in particular the drift of the radar frequency has an interfering effect on time scales, on which the changes in distance of the radar targets are expected too. In that, it has to be considered that the stability requirements are higher, the slower the changes in distance to be measured are. The stability of conventional radar transmitters, which, e.g., are equipped with a free-running, voltage-controlled Gunn oscillator, lies in a temperature range from −30° to 60° C. at $+/-10^{-3}$. For applications requiring higher accuracies, however, stabilities of the emitting frequency of at least $+/-10^{-6}$ are required. Such stabilities can be achieved with temperature-compensated quartz oscillators, which, however, cannot be frequency-modulated and thus cannot be used in a conventional manner for distance measurement with FMCW radar.

Thus, none of the FMCW radar measuring systems described from the state of the art ensures that despite a change in the emitting signal frequency caused by ageing of the components and temperature fluctuations even comparatively small changes in distance can be determined with high measuring accuracy and without relatively high technical effort.

Based on the problem described above, the invention is based on the object to provide a FMCW radar unit as well as a measuring method executable with this unit, using which with relatively simple means, in particular also cost-effectively, high-precision changes in distance can be determined. Above all, high accuracy in the measurement of a change in distance is to be achieved, which compared to the distance between the radar unit and the object to be measured is very small. Preferably, such apparatuses also are to be usable in areas with poor accessibility. In this connection, it is to be possible to realize the measuring method to be provided with a FMCW radar system, which is characterized by a comparatively low energy demand and therefore, for example, can be equipped with an autonomous power supply.

The above-mentioned object is solved with a method according to claim 1 as well as a radar measuring apparatus according to claim 11. Advantageous embodiments of the invention are subject of the dependent claims and explained in more detail in the following description, partially referring to the figures.

The method according to the invention for measuring a change in distance between a stationary initial point, at which an emitting and a receiving unit are located, and an object with a FMCW radar, which emits the frequency-modulated, continuous electromagnetic microwaves as emitting signal as well as receives and evaluates them as echo signal, comprises the following steps:

Emitting of an emitting signal from the initial point in such manner in the direction of the object, that the emitting signal is reflected by the object, Receiving of an echo signal at the initial point, which is generated by the reflection of the emitting signal at the object, Mixing of the emitting signal with the echo signal in a mixer to generate a mixed signal, Evaluating of the mixed signal by performing a frequency analysis in the form of a spectral analysis of the mixed signal for identification of objects to be measured determining the phases of the spectral frequencies allocated to the objects of interest determining the temporal changes of the phases for determination of the changes in distance of the objects of interest.

In order to determine a change in distance and/or a quantity of the change in distance to stationary objects in a highly accurate fashion in addition to the distance determination, which is realized using the procedural steps listed above, the method according to the invention is characterized in that a part of the mixed signal phase, time-independent for stationary targets, is evaluated considering a propagation time of the emitting and/or the echo signal between initial point and object, and based on a change in the part of the phase time-independent for stationary targets the change in distance between initial point and object is determined.

The substantial inventive idea is thus based on evaluating the phase of a mixed signal formed from emitting and echo signal in a FMCW radar unit, which is typically formed from time-dependent and time-independent portions, not only in respect of the time-dependent part, but also of the time-independent part. In this manner it is possible to detect not only distances with a FMCW radar apparatus, too, but also small changes in distance between the radar apparatus and a largely stationary object to be measured.

The time-independent part of the mixed signal phase is composed of two portions, of which the first depends on the propagation time and the center frequency of the emitting and/or echo signal, while the second portion is determined by the square of the propagation time, the frequency deviation of the emitting and/or echo signal as well as the duration of the signal sweep. Since the second portion of the time-independent part of the mixed signal phase is very small under practical conditions, this portion is preferably not considered in the evaluation.

The first portion of the time-independent part of the mixed signal phase is highly dependent on the propagation time of the emitting and/or echo signal between the initial point, i.e. the transmitting antenna of the radar, and the stationary object to be measured. Since to the first portion of the time-independent part of the mixed signal phase the following applies:

$$\phi_{m0}(t_d) = -\omega_0 \cdot t_d$$

wherein $\omega_0$ represents the center frequency of the radar, and $t_d$ represents the propagation time of the emitting and the echo signal, and the mixed signal is described by $$m(t) = m_0 \cdot \cos(\phi_m(t)),$$

results from the two formulas above, that a change in distance of the object to be measured, and thus a change in the propagation time of the emitting and/or echo signal by half a wavelength effects a phase shift by 360°. In this manner, with the method according to the invention, it is possible to measure changes in distance of the target object to be measured of a small fraction of the wavelength of the mixed signal already with high accuracy and comparatively low technical effort. Inaccuracies of the frequency deviation and/or the duration of the signal sweep have no influence on the evaluation described above.

In a particularly suitable further development of the method according to the invention, in addition, a frequency drift of the emitting and/or echo signal, device-specific for the FMCW radar and superimposed on the frequency modulation, as well as a calculative propagation time error resulting therefrom are determined, and the calculative propagation time error caused by the frequency drift is considered in the evaluation of the time-independent part of the mixed signal phase.

The measure described above thus represents a suitable correction in order to exclude measuring errors occurring due to an ageing- and/or temperature change-related change in the frequency, in particular the center frequency, of the emitting and/or echo signal. As soon as it was determined by the evaluation unit, how large the deviation of the momentary emitting and/or echo signal frequency from the original frequency is, this information can be considered in the evaluation of the overall phase shift, so that for the determination of a change in distance between transmitting antenna and stationary object exclusively a shift of the mixed signal phase, which is caused by a changed propagation time of the emitting and echo signal, is considered.

This further development of the invention is thus based on the fact that the drift of the frequency of the emitting signal, preferably the drift of the center frequency of the emitting signal, is determined, and this frequency drift is considered in the evaluation of a phase shift of the mixed signal and thus in the determination of a change in distance between radar and object to be measured. Considering the frequency drift of the emitting and/or echo signal in the evaluation of a phase change in the mixed signal it is possible, compared to the measured distance, to detect very small changes in distance or perform highly accurate distance measurements, respectively. Using the method described, it is in particular possible in a preferred manner to detect changes in distance of up to 0.1 mm/h at an initial distance of about 1000 m.

In a further advantageous embodiment, in addition to the distance or change in distance measurement, at least one further parameter of the ambient air is measured in order to consider this parameter in the evaluation in respect of a speed of light depending on ambient air parameters. The speed of light and thus the speed, with which emitting and/or echo signal propagate, is not constant, but, among other things, depends on air humidity and air temperature. Therefore, in a measurement undertaken according to the invention, air humidity as well as air temperature are preferably recorded and the recorded values considered in the evaluation of the time-independent part of the mixed signal phase, in particular in the determination of the distance from the propagation time and the speed of light or signal propagation, respectively. In this embodiment of the invention it is even possible to securely detect changes in distance of 0.01 mm/h at an initial distance of about 1000 m.

In order to determine the frequency drift, preferably the current center frequency of the emitting signal, which can also be called the actual center frequency, is first determined using a suitable measurement. Taking this actual center frequency as well as the nominal center frequency of the emitting signal, i.e. the theoretical center frequency of the emitting signal of a modulation interval, as the basis, the frequency drift is determined. The frequency drift represents a device-specific change in the frequency of the emitting signal occurring in the course of the operating time of a radar, which is mainly caused by ageing of the electronic components and/or temperature changes.

In an advantageous further development of the invention, this device-specific frequency drift is considered for the determination of the change in distance of a measured distance between radar and object to be measured directly in the determination of the phase change in a mixed signal formed from emitting and echo signal. This further development is thus based on measuring the current, drifting transmission frequency of the FMCW radar and considering this variable frequency in the derivation of the distance from the mixed signal phase. In comparison, for example to the hardware expense of frequency stabilization, the additional effort for realizing the solution for hard- and software according to the invention is comparatively low. The method described can in particular be performed with cost-effective FMCW radar systems, which furthermore are also characterized by a low energy demand.

Compared to the emitting signal, due to the distance between radar device and object to be measured, the receiving signal is, delayed by the propagation time of the signal. A decoupled part of the emitting signal as well as the echo signal reflected by the object to be measured are mixed in a mixer diode. Since the high-frequency portion of the mixed signal is uninteresting for further evaluation, in a special embodiment of the invention, this portion of the mixed signal is filtered out in a low-pass filter downstream of the mixer.

Furthermore, in the evaluation unit of the radar system, the frequency of the mixed signal is determined from the temporal change in the mixed signal phase, i.e. the derivation of the mixed signal as a function of time. The frequency of the mixed signal, which simultaneously represents the difference in frequency between emitting and echo signal, can be represented using the following equation:

$$\frac{\omega_m}{2\pi} = f_m = \frac{B}{T} t_D$$

The time lag between emitting and echo signal depends on the speed of light and the distance between the object to be measured and the emitting antenna located at the initial point. In that, this distance represents an output variable, which for stationary, i.e. largely static objects to be measured, is constant. The difference in frequency between emitting and echo signal is directly proportional to the measured distance, which is illustrated by the following physical relation:

$$D = \frac{c \cdot t_D}{2} = \frac{c \cdot T}{2 \cdot B} \cdot f_m$$

wherein the following applies:
D: Distance between radar apparatus and object to be measured,
$t_D$: Time lag between emitting and echo signal,
c: Speed of light,
B: Bandwidth of the modulated emitting signal, and $$f_m = \frac{B}{T} \cdot t_D:$$

Difference in frequency=Frequency of the mixed signal.

In a very special embodiment of the invention, for determination of the device-specific frequency drift, an intermediate frequency is formed by mixing a reference signal frequency with a nominal center frequency of the emitting and/or echo signal of the radar and subsequent low-pass filtering. Preferably, compared to the nominal center frequency of the emitting signal, the reference signal frequency is shifted by 90 to 110 MHz, in a very special embodiment by 100 MHz. The connection between intermediate signal frequency, nominal center frequency and reference signal frequency can be expressed as follows:

$$f_z = f_0 - f_r$$

wherein the following applies:
$f_z$: Intermediate signal frequency,
$f_0$: Nominal center frequency of the emitting signal, and
$f_r$: Reference signal frequency.

Another special further development of the invention provides determining the periods of the intermediate frequency located within a measuring interval using a counting unit in order to determine the required intermediate frequency based on a quantity of the measuring interval and a number of periods. In that, following a measurement, the counting unit provides the number of the determined periods for the signal processor of the radar. The intermediate frequency can be determined using the following formula:

$$f_Z = \frac{N_Z}{T_{Mess}}$$

wherein the following applies:
 $f_z$: Frequency of the intermediate signal (intermediate signal frequency)
 $N_z$: Periods of the intermediate signal within one measuring interval, and
 $T_{mess}$: Measuring interval.

The device-specific frequency drift may then be determined as the difference of the nominal center frequency and the current center frequency, i.e. the actual center frequency. Thus, this special further development of the invention provides determining an actual center frequency of the emitting and/or echo signal based on the intermediate frequency and the reference signal frequency, and determining the device-specific frequency drift on the basis of a comparison of the nominal center frequency and the actual center frequency. The frequency drift $\Delta f_0$ is determined as follows:

$$\Delta f_0 = f_0'' - f_0 = f_0'' - (f_Z + f_r).$$

In this manner, data for the respective difference in frequency between emitting and echo signal based on the determination of the temporal change in the mixed signal phase, i.e. a derivation of the mixed signal phase as a function of time, on the one hand, and for the respective drift of the emitting and/or echo signal, on the other hand, are available in the evaluation unit for consecutive points in time. If the values for the temporal change in the mixed signal phase change, then basically a change in distance between radar apparatus and object to be measured can be determined from that, wherein these values contain the errors described above. For this reason, according to the invention, as explained above, the recorded variable frequency drift of the emitting and/or the echo signal is directly considered in the determination of a change in distance, i.e. in the determination of a change in the derivation of the mixed signal phase.

Particularly preferred, the counting unit is started at the beginning of a modulation interval and stopped at the end of a predetermined number of subsequent modulation intervals. In that, the counting intervals realized with the counting unit are synchronized in the evaluation unit in respect of the phase of the modulation intervals, so that a fixed phase relation exists between the counting intervals and the modulation intervals. In this connection, an advantageous further development provides, that the counting interval comprises an integer of modulation intervals, even if this, just like the start of the counting unit at the beginning of a modulation interval, is mandatory. In this connection, a special embodiment of the invention provides switching off of the emitting signal of the radar unit while the counting unit is activated and thus interrupting the radar measurement.

In this connection, a further special embodiment of the invention provides guiding the intermediate frequency signal via a crossover to an amplifier and finally to the counting unit.

Beside the method described above, the invention furthermore relates to a FMCW radar system, which in a known manner comprises an emitting as well as receiving antenna and a mixer as well as an evaluation unit. In the evaluation unit, the distance between the radar antenna and the object to be measured is determined from the temporal change in phase of a mixed signal formed from emitting and echo signal. A FMCW radar unit designed according to the invention is furthermore characterized in an evaluation unit being provided with which a time-independent part of the mixed signal phase can be evaluated considering a propagation time of the emitting and/or echo signal between emitting antenna and object to be measured, such that from a change in the propagation time, a change in distance between emitting antenna and object to be measured can be detected.

An evaluation unit of a FMCW radar apparatus designed according to the invention is thus particularly characterized in the mixed signal phase being dividable into its time-dependent and time-independent portion, and the time-independent portion can be evaluated considering a change in propagation time of the emitting and/or echo signal.

In a preferred embodiment of the invention it is provided that an oscillator for generating a reference signal with an at least largely constant frequency is provided, which can be fed into the receiving unit via an auxiliary antenna, wherein a crossover is installed downstream of the receiving unit, via which an intermediate frequency signal having an intermediated frequency, formed by mixing emitting and reference signal, is guided to a counting unit for determining the periods within a measuring interval, wherein the counting unit is connected with a digital signal processor such that on the basis of the periods determined, the quantity of the intermediate frequency is determined, and on the basis of a comparison of an actual center frequency with) a nominal center frequency, a device-specific frequency drift of the FMCW radar and the determined frequency drift are included into the determination of a change in distance between the initial point and the object.

A special further development of the radar unit according to the invention provides the emitting and receiving units being integrated into a common radar antenna.

The oscillator preferably is a quartz-stable, temperature-compensated oscillator, which generates a reference signal with a frequency shifted compared to the nominal radar center frequency.

A preferred use of the described FMCW radar apparatus designed according to the invention for determining a change in distance, and in particular its special embodiment, which considers an additionally determined frequency drift of the apparatus, relates to the observation of rock movements, preferably of rock or stone formations in the mountains. With an apparatus working such precisely, it is possible in a preferred manner to detect imminent landslides or mudflows, in order to be able to initiate respective warning or safeguarding measures, like for example blockage of a road, in time.

With a respective FMCW radar apparatus it is possible to perform a highly precise, comparatively cost-effective measurement of a change in distance by positioning the apparatus at a distance of preferably 10 m to 5 km from the rock constellation to be measured, in particular a slope, which is on the verge of collapsing, in order to detect even smallest rock movements. Such apparatuses may preferably also be set up in rough terrain, since they are characterized by very low energy consumption and thus a self-sufficient power supply can be set up together with the apparatus.

In the following, the invention is explained in more detail without limiting the general inventive idea referring to the figures. In the figures.

Figure 1:
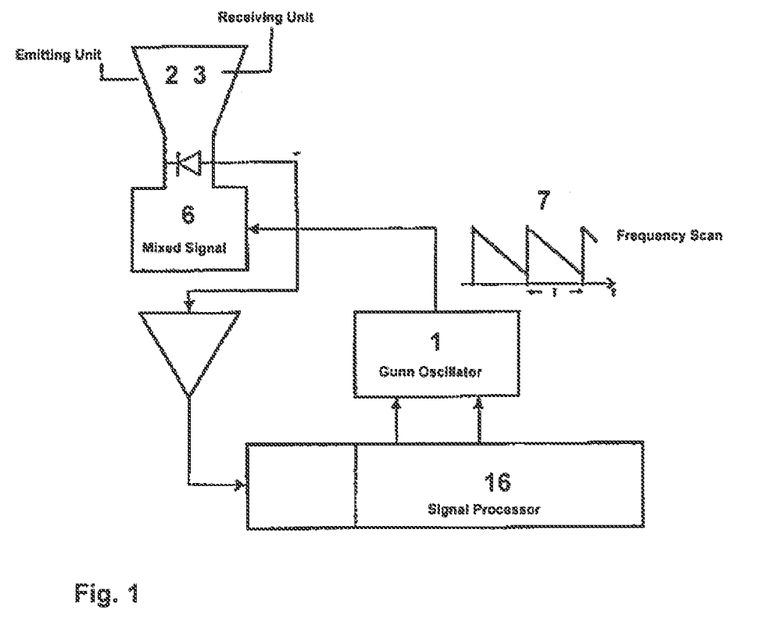
FIG. 1: shows the general setup of a FMCW radar.

FIG. 1 shows the basic setup of conventional FMCW radar systems. In such apparatuses, usually a signal is generated using a free-running voltage-controlled Gunn oscillator 1, which signal is transmitted to an emitting unit 2, by which via a parabolic antenna, frequency-modulated linearly polarized electromagnetic waves are emitted. The parabolic antenna is oriented such that the emitting signal 4 hits an object to be measured, which reflects the emitting signal 4, and an echo signal 5 is received by a receiving unit 3, which usually is integrated in one antenna together with the emitting unit. The reflected echo signal 5 is mixed with a portion of the emitting signal in a mixer diode 6. The determination of the distance between radar apparatus and object to be measured is undertaken in an evaluation unit by determining the difference in frequency between emitting and echo signal, by determining the temporal change in the mixed signal phase.

A great advantage of FMCW radar apparatuses consists in them, contrary to pulse radar apparatuses, requiring a lower transmitting power in order to achieve a good signal-to-noise ratio.

In the following, the mathematical background for measuring the phase change with conventional FMCW radar apparatuses is explained.

During a frequency sweep $$-\frac{T}{2} \leq t \leq \frac{T}{2}$$

apply:
for the emitting signal $$s(t) = s_0 \sin(\varphi_s(t)) \quad (1)$$

the receiving signal $$e(t) = e_0 \sin(\varphi_s(1-t_d)) \quad (2)$$

the emitting phase $$\frac{\varphi_s(t)}{2\pi} = f_0 t - \frac{1}{2}\frac{B}{T}t^2 + \left(\varphi_0 - \frac{1}{8}BT\right) \quad (3)$$

and the propagation time $$t_d = 2x/c \quad (4).$$

In that,
x is the target distance,
c is the speed of light,
B is the frequency deviation (~bandwidth),
$f_0$ is the center frequency of the radar,
T is the duration of the frequency sweep,
$\varphi_s$ is the phase of the emitting signal,
$\varphi_0$ is the phase of the center frequency of the emitting signal in the point of time t=0,
$s_0$ is the amplitude of the emitting signal,
$e_0$ is the amplitude of the receiving signal.

To the low-frequency component of the mixed signal applies:

$$m(t) = m_0 \cos(\varphi_m(t)) \quad (4)$$

with
$m_0$=amplitude of the mixed signal (will not be considered any further in the following),
$\varphi_m(t)$=phase of the low-frequency part of the mixed signal $$\varphi_m = \varphi_s(1-t_d) - \varphi_s(t) \quad (5)$$

Using $\varphi$, from equation (3) in equation (5), the following results:

$$\frac{\varphi_m(t)}{2\pi} = \frac{B}{T}t_d t - f_0 t_d - \frac{1}{2}\frac{B}{T}t_d^2 \quad (6)$$

With a temporally fixed target distance, $t_d$ is constant. Only the first term on the right-hand side of equation (6) then is time-dependent. The temporal derivation of $\varphi_m(t)/(2\pi)$, i.e. the frequency of the mixed signal, then is $$f_m = \frac{B}{T}t_d \quad (7)$$

This frequency is the basis for the usual distance measurement with a FMCW radar. As becomes clear in this connection, the second and third term are not considered in the evaluation, and therefore are insignificant for the determination of $\omega_m$, since these terms are omitted in the derivation as a function of time.

FIG. 2a shows a frequency-modulated emitting signal 4, which has a sawtooth-like curve. Furthermore, offset to this, the echo signal 5 reflected by a stationary object is represented. With the frequency modulation of the emitting signal 4, the frequency scan 7, the so-called sweep, moves from $$f_0 + \frac{B}{2} \text{ to } f_0 - \frac{B}{2}$$

ab and subsequently jumps back again to a value of $$f_0 + \frac{B}{2}.$$

In that, $f_0$ represents the value for the center frequency of the emitting signal 4, while B represents the bandwidth, sometimes also called frequency deviation, of the emitting signal 4. It is clearly noticeable that the echo signal 5 lags behind the emitting signal 4 (see also enlarged detail of FIG. 2a), so that the momentary frequency of the echo signal 5 is always higher than the frequency of the emitting signal 4. This difference in the frequencies is called frequency difference between emitting and echo signal.

Figure 2:
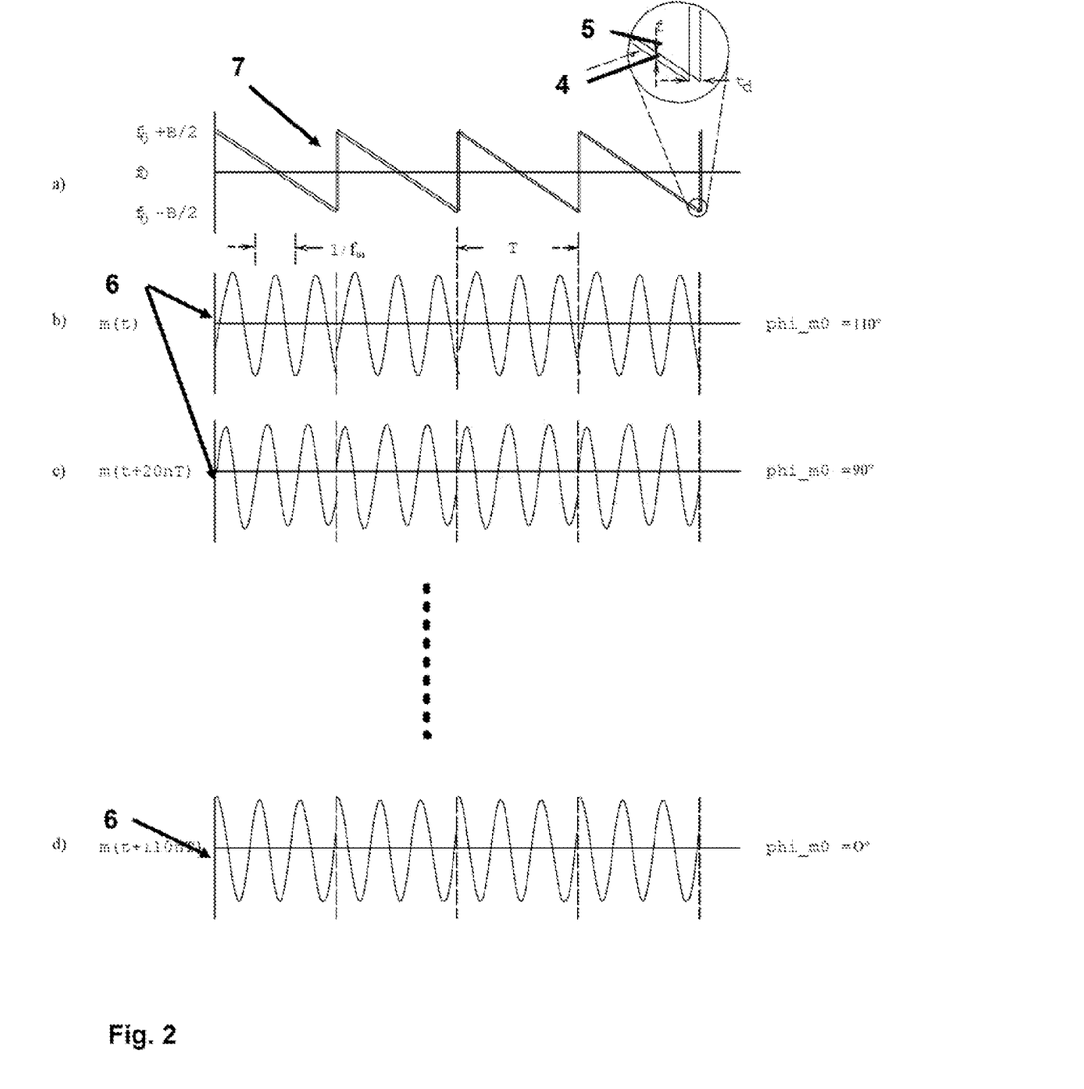
FIG. 2*a*: shows a frequency-modulated emitting signal and an echo signal reflected by a stationary object.
FIG. 2*b*-2*d*: shows a mixed signal formed in the mixer by mixing emitting and echo signal.

FIGS. 2b to 2d respectively represent the functions of the initial signal resulting at the mixer diode, which for the rest is designated as mixed signal 6. This signal is formed by mixing the emitting signal 4 with the echo signal 5 formed by at least partial reflection of the emitting signal 4 at a quasi-stationary object, wherein the so-called mixing is a mathematical multiplication of the functions of both signals. The frequency of the mixed signal 6 simultaneously represents the difference in frequency between the emitting 4 and the echo signal 5. Thus, the reciprocal value of the period duration is the frequency of the mixed signal 6 and thus the difference in frequency between emitting 4 and echo signal 5. FIGS. 2b to 2d respectively represent the function of the mixed signal 6 for a duration of four frequency sweeps. In the cases represented, the mixed signal according to FIG. 2c compared to that according to FIG. 2b is delayed by 20 nT, the mixed signal according to FIG. 2d is compared to the signal according to FIG. 2b delayed by 110 nT. In the examples represented in FIG. 2, it was assumed that a change in distance to the target object results in a phase change of 1 after n frequency sweeps, wherein n is substantially higher than 1. Thus, in this case, the following applies:

$$\frac{360}{2\pi}\frac{\partial \varphi_{m0}}{\partial t} = \frac{1°}{n \cdot T}.$$

According to the invention it is suggested, following rough localization of the target using $f_m$, to additionally evaluate the time-independent part of the mixed signal phase. The time-independent part of the phase is described by the second and third terms of equation (6). Both terms contain factor $t_d$, i.e. information about the propagation time of the emitting and echo signal. In that, under all practical conditions, the third term is very small compared to the second one, so that the third term is neglected for further evaluation.

The second term $$\frac{1}{2\pi}\varphi_{m0}(t_d) = -f_0 t_d \qquad (8)$$

on the other hand, depends on the propagation time. If equation (4) is used for the propagation time, then it becomes clear that a change in the target distance of half a wavelength effects a phase shift by 360°. Therefore, changes in the target distance of a small fraction of the wavelength can be measured comparatively easy and exact by evaluation of the phase $\phi_{m0}(t_d)$. Uncertainties by errors of the frequency deviation B or the length of a modulation interval T, i.e. the length of a signal sweep, are insignificant for that.

Contrary to the conventional measurement of a distance with a FMCW radar apparatus and the associated frequency evaluation, detecting a change in distance by a phase evaluation, however, depends on the center frequency $f_0$ of the emitting and/or echo signal. A relative error of the center frequency results in an amount of the relative error of the propagation time or target distance, respectively, which is just as high.

The method described is above all suitable for measurements of very small changes in distance, which occur over a comparatively long period, i.e. for quasi very slow changes in distance. With these measurements, it should above all be ensured that the change in distance between two consecutive measurements does not exceed the uniqueness range of the phase measurement. Thus, it is simultaneously ensured that equation (6), which assumes general stationarity of the target object, still represents a sufficiently exact description of the mixed signal. For a wavelength of 1.25 cm chosen as an example and a measuring time of 1 s, this means that the theoretical maximum change in distance per time unit (=speed of movement of the target object) must not exceed 0.625 cm s$^{-1}$.

The lower limit of the recordable speed substantially depends on the stability of the relation between phase and propagation time described by equation (8). The relative drift of the propagation time error (target distance error) is equal to the (negative) relative drift of the center frequency error.

For a drift of the center frequency error of $10^{-7}$ h$^{-1}$ and a target distance of 1 km, this, for example, means that the error of the speed measurement, and thus the recordable lower limit of the speed, lies at 0.1 mm h$^{-1}$.

Figure 3:
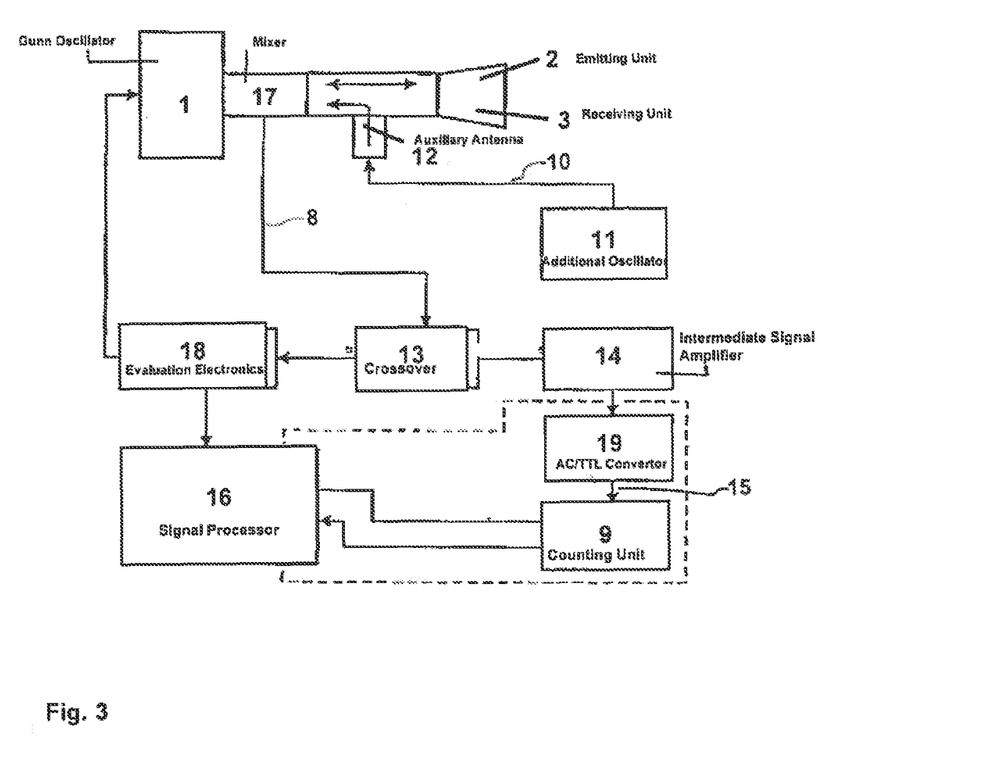
FIG. 3: shows a FMCW radar with integrated determination of the frequency drift of the emitting signal.

FIG. 3 shows a circuit diagram of a modified FMCW radar, with which for determination of the propagation time error not caused by a change in distance of the target object, a frequency drift of the emitting signal 4, which can be caused by component ageing and/or temperature fluctuations, is used for determination of changes in distance between the radar apparatus and an object to be measured. In addition to the plant components explained in connection with FIG. 1 already, above all a counting unit 9 designed as a frequency counter is provided, with which the periods of an intermediate frequency signal 8 generated using a reference signal 10 are determined.

In the FMCW radar designed according to the invention and represented in FIG. 3, in addition to the conventional design according to FIG. 1, a quartz-stable, temperature-compensated oscillator 11 is provided, which generates a reference signal 10 with a reference frequency shifted by 100 MHz compared to the nominal center frequency of the emitting signal 4. In this case, the center frequency of the emitting signal is 24.15 GHz, while the reference signal 10 has a reference signal frequency of 24.05 GHz. The reference signal 10 is fed into the receiving unit 3 of the radar apparatus via an auxiliary antenna 12. Subsequently, the reference signal 10 is mixed with the emitting signal 4 in the mixer 17, and the intermediate signal 8 formed in this manner is via a crossover 13 guided to an intermediate signal amplifier 14, and from there via a low-pass filter 15, following AC/TTL conversion, finally to the counting unit 9.

The counter 9 counts the periods of the intermediate signal 8 within a determinable measuring interval.

After the measurement, the counting unit 9 designed as a frequency counter provides the count to the signal processor 16 of the radar, so that here, from the number of periods as well as the duration of the measuring interval, the intermediate signal frequency of the intermediate signal 8 is calculated. Finally, the current frequency drift, i.e. the difference between the theoretically predetermined center frequency, usually designated as the nominal center frequency of the emitting signal 4, and the effective actual center frequency of the emitting signal 4 is determined. In this connection, for determination of the effective actual center frequency of the emitting signal 4, the intermediate signal frequency and the reference signal frequency are added considering the respective sign.

The digital signal processor 16 of the FMCW radar activates the counting unit 9 at the beginning of a modulation interval and stops it after an integer multiple number of subsequent modulation intervals. The counter contents of the counting unit 9 represents the frequency with 100 Hz absolute resolution and relating to the emitting frequency with 0.4× $10^{-8}$ relative resolution. This counter contents is read out by the digital signal processor 16 and included into the standard data flow.

The method according to the invention or the FMCW radar apparatus designed according to the invention, respectively, is thus based on a hardware extension of a standard FMCW radar apparatus and offers the possibility to determine the variably drifting frequency of the emitting signal 4 and to directly use the determined value for the determination of a change in distance between radar apparatus and object to be measured.

For that, the current, drifting frequency of the emitting signal is measured in comparison to a reference signal frequency, and this variable frequency is considered in the derivation of the distance from the radar echo phase.

The counting unit 9 designed as a frequency counter is a CPLD module. The principle of frequency measurement used is based, as described above, on the counting of the periods of the intermediate signal 8 within a certain time. The frequency counter 9 used for the method designed according to the invention thus substantially consists of two counters. The first counter is a synchronous count-down counter, which with the system clock of the CPLD chip of 20 MHz decrements an initialization value into its 28 bit long register. Herewith, the time interval of a frequency measurement can be set to up to 13.4 sec. During this time interval, the second counter, a so-called period counter, increments its register contents (32 bit) with each increasing flank at the TTL input for the frequency of the intermediate signal 8. Substantial in that is the conversion of the intermediate signal 8 with the intermediate frequency into a TTL-conforming signal by the AC/TTL converter 19.

The specification incorporates by reference the disclosure of German 10 2009 024 883.8 filed Jun. 9, 2009, as well as International application PCT/DE2010/000609 filed Jun. 2, 2010.

The present invention is, of course, in no way restricted to the specific disclosure of the specification and drawings, but also encompasses any modifications within the scope of the appended claims.

REFERENCE LIST

1 Gunn oscillator
2 Emitting unit
3 Receiving unit
4 Emitting signal
5 Echo signal
6 Mixed signal
7 Frequency scan (sweep)
8 Intermediate signal
9 Counting unit
10 Reference signal
11 Additional oscillator
12 Auxiliary antenna
13 Crossover
14 Intermediate signal amplifier
15 Low-pass filter
16 Signal processor
17 Mixer
18 Evaluation electronics
19 AC/TTL converter

The invention claimed is:

1. A method for measuring a change in distance between a stationary initial point and a largely stationary object with a FMCW radar apparatus, which emits frequency-modulated, continuous electromagnetic microwaves as an output or emitting signal as well as receives and evaluates them as an echo signal, comprising the steps of:

sending from said radar device an emitting signal from said initial point in the direction of said object such that said emitting signal is reflected by said object, receiving at said radar device an echo signal, which is generated by the reflection of said emitting signal at said object, mixing said emitting signal with said echo signal in a mixer for generating a mixed signal, evaluating said mixed signal via evaluating means by determining a temporal change in the mixed signal phase, i.e. the frequency of said mixed signal, in order to determine the distance between said initial point and said largely stationary object based on said temporal change in the phase, including evaluating a time-independent part of said mixed signal phase taking into consideration a propagation time of said emitting and/or echo signal between initial point and object, and determining the change in the distance between said initial point and said object is determined based on a change in said time-independent part of said phase, determining via determining means a frequency modulation-superimposed frequency drift of at least one of said emitting and said echo signal, device-specific for said FMCW radar, as well as a calculative propagation time error resulting therefrom, and considering said calculative propagation time error caused by said frequency drift is considered in the evaluation of said time-independent part of said mixed signal phase, wherein a high-frequency portion of said mixed signal is filtered out of said mixed signal prior to evaluation using a low-pass filter, and wherein for determining said device-specific frequency drift, an intermediate frequency is formed in said mixer by mixing a reference signal frequency with a nominal center frequency of at least one of said emitting and said echo signal of said radar and subsequent low-pass filtering.

2. A method according to claim 1, wherein said reference signal frequency, compared to said nominal center frequency, is shifted by 90 to 110 MHz by means of an oscillator.

3. The method according to claim 1, wherein using a counting unit, the periods of said intermediate frequency within one measuring interval are determined in order to determine said intermediate frequency based on a magnitude of said measuring interval and a number of said periods.

4. The method according to claim 1, wherein based on said intermediate frequency and said reference signal frequency, an actual frequency of at least one of said emitting and said echo signal is determined by processing means, and based on a comparison of said nominal center frequency and said actual frequency, the device-specific frequency drift is determined by said processing means.

5. The method according to claim 3, wherein said counting unit is activated by processing means during the measurement at times only.

6. The method according to claim 3, wherein said counting unit is activated at the beginning of a modulation interval of a frequency sweep of said emitting signal by processing means.

7. A radar apparatus that emits frequency-modulated, continuous electromagnetic microwaves as an emitting signal and also receives such signal due to reflection at a largely stationary object as an echo signal, for measuring at least one of a distance and a change in distance between a stationary initial point and said object, comprising:

an emitting unit and a receiving unit for sending and receiving said emitting signal and said receiving signal, a mixer for mixing said emitting signal and receiving signal, and evaluation electronics in which, based on a temporal phase change in said mixed signal, a distance between said initial point and said object can be determined, wherein said evaluation electronics is configured to evaluate a time-independent part of said mixed signal phase, considering a frequency drift and a propagation time of at least one of said emitting and said echo signal between said emitting unit and said object, such that from a change in said propagation time a change in said distance between said emitting unit and said object can be detected.

8. The radar apparatus according to claim 7, which further includes an oscillator for generating a reference signal having an at least largely constant frequency, which can be fed into said receiving unit via an auxiliary antenna, wherein a crossover is installed downstream of said receiving unit, via which an intermediate frequency signal formed by mixing emitting and reference signal and having an intermediate frequency is guided to a counting unit for determining the periods within one measuring interval, and wherein said counting unit is connected with a digital signal processor such that, based on the periods determined, the magnitude of said intermediate frequency is determined and, based on a comparison of an actual frequency with a nominal center frequency, a device-specific frequency drift of the Doppler radar, and from said frequency drift a change in distance between initial point and object can be determined.

9. The radar according to claim 8, wherein said oscillator is quartz-stable and temperature-compensated.

10. The radar apparatus according to claim 7, wherein emitting and receiving unit are integrated into one radar antenna.

11. Use of a radar apparatus according to claim 7, which includes the step of determining movement of a rock formation by means of said radar apparatus.

* * * * *